(12) United States Patent
Kim

(10) Patent No.: US 8,878,813 B2
(45) Date of Patent: Nov. 4, 2014

(54) METHOD AND APPARATUS FOR TOUCH INPUT IN PORTABLE TERMINAL

(75) Inventor: Hak-Yeol Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 466 days.

(21) Appl. No.: 13/083,846

(22) Filed: Apr. 11, 2011

(65) Prior Publication Data

US 2011/0248956 A1   Oct. 13, 2011

(30) Foreign Application Priority Data

Apr. 12, 2010   (KR) .................... 10-2010-0033167

(51) Int. Cl.
*G06F 3/045*   (2006.01)
*G06F 3/044*   (2006.01)

(52) U.S. Cl.
CPC ...... *G06F 3/044* (2013.01); *G06F 2203/04104* (2013.01); *G06F 2203/04106* (2013.01); *G06F 3/045* (2013.01)
USPC ....................... 345/174; 178/18.05; 178/18.06

(58) Field of Classification Search
USPC .......... 345/173–178; 178/18.01–18.09, 18.11
See application file for complete search history.

(56) References Cited

U.S. PATENT DOCUMENTS

| | | | |
|---|---|---|---|
| 2006/0267959 A1* | 11/2006 | Goto et al. | 345/173 |
| 2008/0204418 A1* | 8/2008 | Cybart et al. | 345/173 |
| 2008/0316182 A1* | 12/2008 | Antila et al. | 345/173 |
| 2009/0020343 A1* | 1/2009 | Rothkopf et al. | 178/18.05 |
| 2011/0115732 A1* | 5/2011 | Coni et al. | 345/173 |
| 2011/0199324 A1* | 8/2011 | Wang et al. | 345/173 |

FOREIGN PATENT DOCUMENTS

| | | | |
|---|---|---|---|
| KR | 10-2009-0063042 A | 6/2009 | |
| KR | 10-2009-0072347 A | 7/2009 | |

* cited by examiner

*Primary Examiner* — Stephen Sherman
(74) *Attorney, Agent, or Firm* — Jefferson IP Law, LLP

(57) ABSTRACT

An apparatus and method for a touch input of a portable terminal are provided. More particularly, an apparatus and method for improving performance of a touch input device by using a multi-touch panel which supports both a resistive type and a capacitive type of touch input detection are provided. The apparatus includes a multi-touch panel for performing both a capacitive type and a resistive type of touch input detection in one touch panel, a pattern determining unit for analyzing a touch input pattern of a user by using the multi-touch panel, and a touch manager for determining a touch input coordinate corresponding to the touch input pattern of the user based on one of the capacitive type and the resistive type of touch input detection.

19 Claims, 6 Drawing Sheets

METHOD AND APPARATUS FOR TOUCH INPUT IN PORTABLE TERMINAL

PRIORITY

This application claims the benefit under 35 U.S.C. §119 (a) of a Korean patent application filed in the Korean Intellectual Property Office on Apr. 12, 2010 and assigned Serial No. 10-2010-0033167, the entire disclosure of which is hereby incorporated by reference.

BACKGROUND OF THE INVENTION

1. Field of the Invention

The present invention relates to an apparatus and method for a touch input of a portable terminal. More particularly, the present invention relates to an apparatus and method for improving performance of a touch input device by using a multi-touch panel which supports both a resistive type touch input detection and a capacitive type touch input detection.

2. Description of the Related Art

Portable terminals are now widely used due to convenience gained through their portability. In response to this trend, service providers (or terminal manufacturers) are competitively developing the portable terminals with an increasing number of convenient functions in order to attract more users.

For example, the portable terminal provides various functions such as a phonebook, a game, a scheduler, a Short Message Service (SMS), a Multimedia Message Service (MMS), a Broadcast Message Service (BMS), an Internet service, an Electronic (E)-mail service, a morning call, a Motion Picture Expert Group (MPEG)-1 or MPEG-2 Audio Layer-3 (MP3) player, a digital camera, and other similar products and services.

Additionally, with the development of a touch screen type of portable terminal for inputting data by using a user's finger or a stylus, a user can easily and simply write some text or draw a line on the portable terminal by using the stylus.

There are two types of touch screens, namely a resistive type touch screen and a capacitive type touch screen.

The resistive type touch screen includes an upper plate electrode and a lower plate electrode that are arranged with a specific space. When the user presses an upper plate, the upper plate is brought into contact with the lower plate. A coordinate is read by using a resulting resistance value. The capacitive type touch screen uses a capacitance of a human body to find a coordinate when a touch is made by using the capacitance that varies when a screen is touched.

The resistive type touch screen does not allow multiple touches, but enables a delicate touch input. The capacitive type touch screen does not allow the use of an additional input tool such as a stylus but is advantageous for an icon-oriented touch input.

However, the touch screen implemented by the portable terminal of the related art does not support both types of touch screens and instead only supports one type of touch screen.

Accordingly, there is a need for an apparatus and method for improving touch screens in the portable terminal by implementing a touch screen supporting both a resistive type and capacitive type of touch input detection in the portable terminal

SUMMARY OF THE INVENTION

Aspects of the present invention are to address at least the above-mentioned problems and/or disadvantages and to provide at least the advantages described below. Accordingly, an aspect of the present invention is to provide an apparatus and method for a touch input supporting a combined resistive type and capacitive type touch screen in a portable terminal.

Another aspect of the present invention is to provide an apparatus and method for providing a touch panel capable of performing both a capacitive type and a resistive type of touch input detection in one touch panel of a portable terminal.

Another aspect of the present invention is to provide an apparatus and method for providing a multi-touch panel that uses capacitive type electrode films as a resistive type upper and lower plate electrode in a portable terminal.

In accordance with an aspect of the present invention, an apparatus for a touch input of a portable terminal is provided. The apparatus includes a multi-touch panel for performing both a capacitive type and a resistive type of touch input detection in one touch panel, a pattern determining unit for analyzing a touch input pattern of a user by using the multi-touch panel, and a touch manager for determining a touch input coordinate corresponding to the touch input pattern of the user based on one of the capacitive type and the resistive type of touch input detection.

In accordance with another aspect of the present invention, a touch input method of a portable terminal is provided. The method includes analyzing a touch input pattern of a user by using a multi-touch panel for performing both a capacitive type and a resistive type of touch input detection in one touch panel, and determining a touch input coordinate corresponding to the touch input pattern of the user based on one of the capacitive type and the resistive type of touch input detection.

In accordance with another aspect of the present invention, a touch input apparatus of a portable terminal is provided. The apparatus includes a touch screen panel for performing a capacitive type of touch input detection and a resistive type of touch input detection by using capacitive type electrode films as resistive type upper and lower plate electrodes, a pattern determining unit for determining a touch input pattern corresponding to a capacitive type touch when a touch is made to an extent sufficient to perform the capacitance type of touch input detection and for determining a touch input pattern of a resistive type touch when a touch is made to an extent to perform the resistive type of touch input detection when the upper and lower plates are brought into contact, and a touch manager for determining a touch input coordinate corresponding to a touch input pattern of the user, wherein the touch manager performs an electrode switching process for changing resistance values input through a plurality of channels to a resistance value input through one channel.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
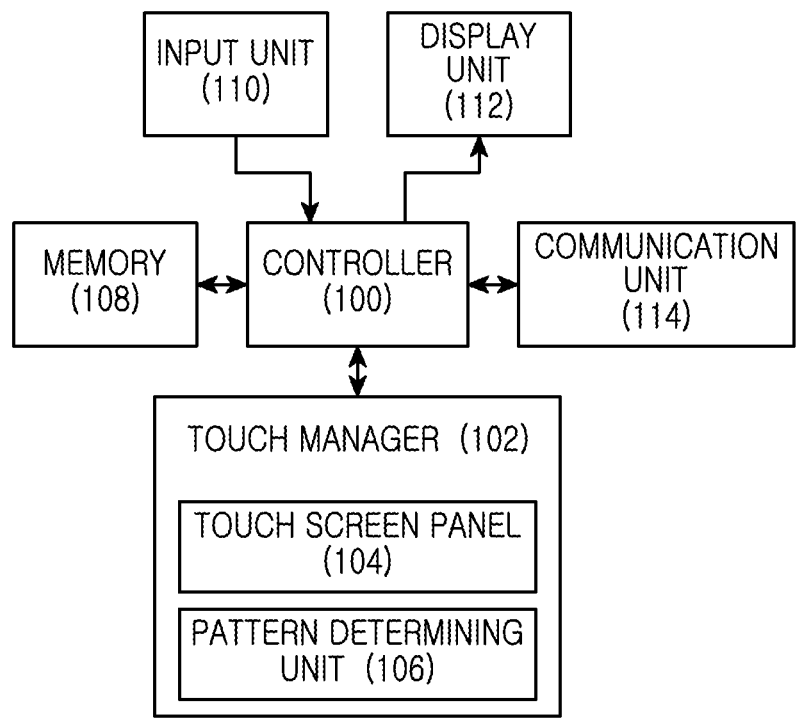
FIG. 1 is a block diagram illustrating a structure of a portable terminal which performs both a resistive type and a capacitive type of touch input detection according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention will be described herein below with reference to the accompanying drawings. In the following description, well-known functions or constructions are not described in detail since they would obscure the invention in unnecessary detail.

Exemplary embodiments of the present invention described hereinafter relate to an apparatus and method for performing both a resistive type and a capacitive type of touch input detection in one touch panel by providing a multi-touch panel that uses capacitive type electrode films as resistive type upper and lower plate electrodes.

FIGS. 1 through 5, discussed below, and the various exemplary embodiments used to describe the principles of the present disclosure in this patent disclosure are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

FIG. 1 is a block diagram illustrating a structure of a portable terminal which performs both a resistive type and a capacitive type of touch input detection according to an exemplary embodiment of the present invention.

Referring to FIG. 1, the portable terminal includes a controller 100, a touch manager 102, a memory 108, an input unit 110, a display unit 112, and a communication unit 114. The touch manager 102 includes a touch screen panel 104 and a pattern determining unit 106. However, the portable terminal may include additional units that are not illustrated here merely for sake of clarity. Similarly, the functionality of two or more of the above noted units may be integrated into a single component.

The controller 100 provides overall control of the portable terminal. For example, the controller 100 processes and controls voice telephony and data communications. In addition to its typical function, according to an exemplary embodiment of the present invention, the controller 100 performs an operation for detecting a touch input of a user by using the touch screen panel 104 so that a combined resistive type and capacitive type touch panel can be implemented.

More specifically, the controller 100 analyzes a touch input pattern of the user who inputs the touch screen panel and determines a touch input coordinate corresponding to a result of the analysis. For example, if the user of the portable terminal touches only an upper plate to an extent sufficient to perform a capacitance type of touch detection, the controller 100 determines the touch input coordinate of the user on the basis of the capacitive type of touch detection, and if the upper and lower plates are brought into contact and thus a touch is made to an extent to perform a resistive type touch detection, the controller 100 determines the touch input coordinate of the user on the basis of the resistive type of touch detection.

The touch manager 102 analyzes the touch input pattern of the user under the control of the controller 100, and determines the touch input coordinate by using a method corresponding to the analyzed touch input pattern. In addition, when the upper or lower plate of the touch screen panel 104 operates in a multi-channel structure, the touch manager 102 performs an electrode switching process to change resistance values input through a plurality of channels into a resistance value input through one channel under the control of the controller 100. The reason for changing the resistance values input through the plurality of channels into the resistance value input through one channel is that the touch input coordinate may not be determined correctly since any one of the upper plate electrode and lower plate electrode receives the resistance value through one channel and the other electrode receives the resistance value through the plurality of channels. In this case, if the upper plate and the lower plate operate in the same structure in such a manner that the upper plate and the lower plate receive the resistance value input through one channel or the upper plate and the lower plate receive the resistance value through the plurality of channels, the touch manager 102 does not perform the electrode switching process.

The touch screen panel 104 recognizes input information input from the user as pressure points caused by pressure, and converts the pressure points into touch screen panel data. In order for the portable terminal of an exemplary embodiment of the present invention to perform both the resistive type and the capacitive type of touch input detection, capacitive type electrode films are used as resistive type upper and lower plate electrodes in one touch screen panel 104.

The pattern determining unit 106 determines whether the user performs a touch input that should be detected using a resistive type of touch input detection or a conductive type of touch input detection, under the control of the touch manager 102.

The memory 108 may include a Read Only Memory (ROM), a Random Access Memory (RAM), a flash ROM, or other similar storage devices. The ROM stores a microcode of a program, by which the controller 100 and the touch manager 102 are processed and controlled, and a variety of reference data.

The RAM is a working memory of the controller 100 and stores temporary data that is generated while programs are performed. In addition, the flash ROM stores a variety of rewritable data, such as phonebook entries, outgoing messages, incoming messages, and other similar data.

The input unit 110 includes a plurality of function keys such as numeral key buttons of '0' to '9', a menu button, a cancel button, an OK button, a talk button, an end button, an Internet access button, a navigation key button, and a character input key and other similar input keys and buttons. Key input data, which is input when the user presses these keys, is provided to the controller 100.

The display unit 112 displays information such as state information, which is generated while the portable terminal operates, moving and still pictures, etc. The display unit 112 may be a color Liquid Crystal Display (LCD), an Active Mode Organic Light Emitting Diode (AMOLED) display, and other similar display apparatuses. The display unit 112 may be used as an input device by employing a multi-touch panel according to the exemplary embodiment of the present invention.

The communication unit 114 transmits and receives a Radio Frequency (RF) signal of data that is input and output through an antenna (not illustrated). For example, in a transmitting process, data to be transmitted is subject to a channel-coding process and a spreading process, and then the data is transformed into an RF signal. In a receiving process, the RF signal is received and transformed to a base-band signal, and the base-band signal is subject to a de-spreading process and a channel-decoding process, thereby restoring the data.

Although a function of the touch manager 102 may be performed by the controller 100 of the portable terminal, the touch manager 102 and the controller 100 are separately constructed in an exemplary embodiment of the present invention for exemplary purposes only. Thus, those of ordinary skill in the art will understand that various modifications can be made within the scope of the present invention. For example, functions of the touch manager 102 and the controller 100 can be integrally configured to be processed by the controller 100.

Figure 2:
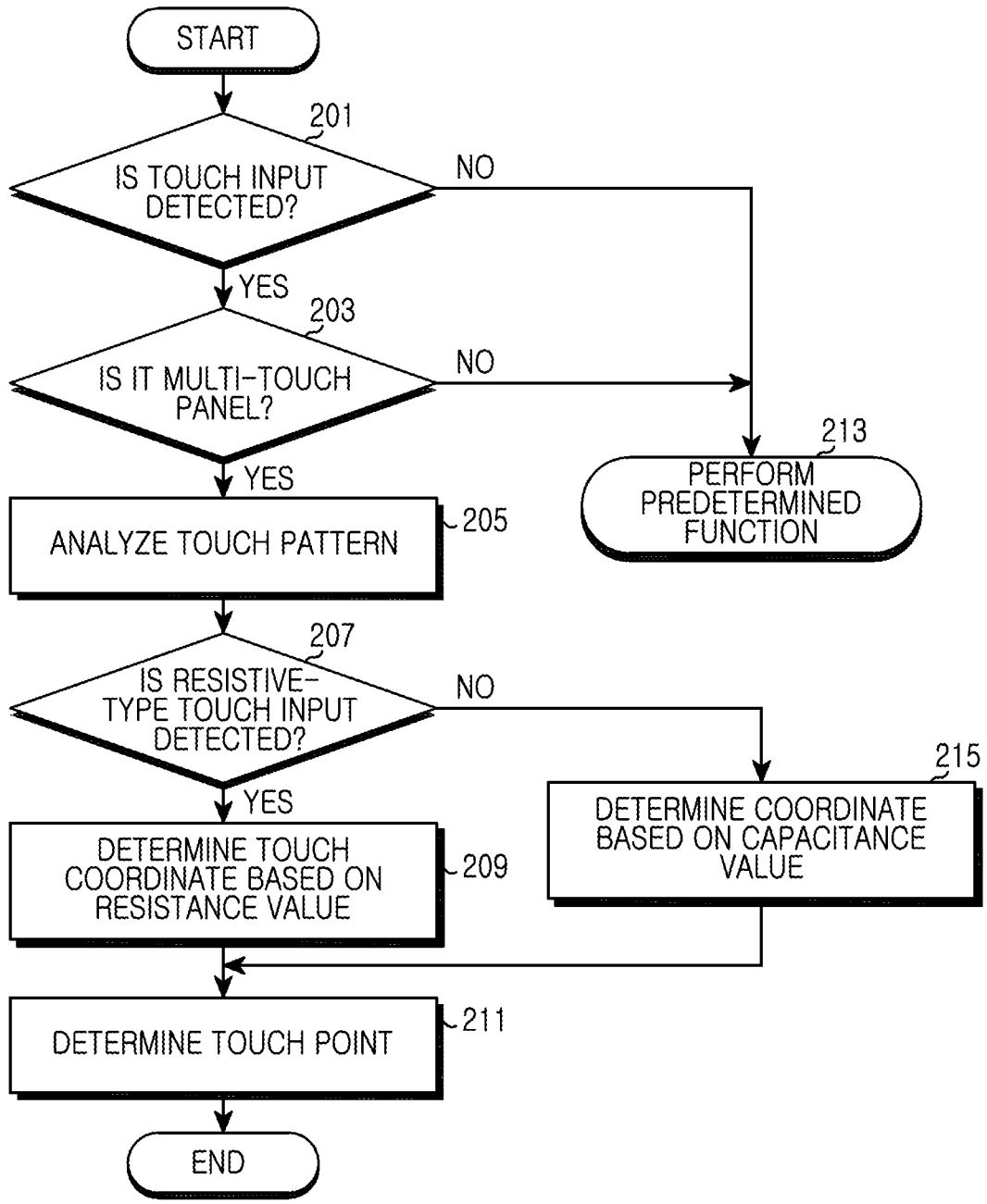
FIG. 2 is a flowchart illustrating a process of detecting a touch input of a user in a portable terminal according to an exemplary embodiment of the present invention.

FIG. 2 is a flowchart illustrating a process of detecting a touch input of a user in a portable terminal according to an exemplary embodiment of the present invention.

Referring to FIG. 2, the portable terminal determines whether the touch input of the user is detected in step 201.

If it is determined in step 201 that the touch input of the user is not detected, the portable terminal proceeds to step 213 to perform a predetermined function (e.g., a standby mode).

Otherwise, if it is determined in step 201 that the touch input of the user is detected, the portable terminal proceeds to step 203 to determine whether the touch input of the user is detected in a multi-touch panel. Herein, the multi-touch panel is a touch panel capable of performing both a resistive type and capacitive type of touch input detection in one touch panel, and is a touch panel constructed such that two-layer or three-layer capacitive type electrode films are used as an upper-plate electrode and a lower-plate electrode.

If it is determined in step 203 that the touch input of the user is not detected in the multi-touch panel, the portable terminal proceeds to step 213 to perform a predetermined function (e.g., touch coordinate analysis is performed on a touch panel according to a specific method).

Otherwise, if it is determined in step 203 that the touch input of the user is detected in the multi-touch panel, the portable terminal proceeds to step 205 to analyze the touch pattern. The operation of step 205 is performed to determine whether the multi-touch panel is touched by the user of the portable terminal in a manner where the touch should be detected using a capacitive type touch input detection or a resistive type touch input detection. Hereafter, a touch in a manner where a capacitive type touch input detection should be employed is referred to as a capacitive type touch (also referred to as a C touch). Also, a touch in a manner where a resistive type touch input detection should be employed is referred to as a resistive type touch (also referred to as an R touch).

The portable terminal includes the multi-touch panel capable of performing both the capacitive type of touch input detection and the resistive type of touch input detection in one touch panel according to an exemplary embodiment of the present invention. The C touch can cause a capacitance type coordinate to be detected when only an upper plate is touched. The R touch can cause a resistive type coordinate to be detected when upper and lower plates are brought in contact.

In step 207, the portable terminal determines a result of the touch pattern analysis process of step 205.

If it is determined in step 207 that a resistive type touch input, i.e., an R touch input, is detected, the portable terminal proceeds to step 209 to determine a coordinate of a location at which the touch input of the user is made on the basis of a resistance value that varies when the upper and lower plates of the multi-touch panel are brought in contact.

Otherwise, if it is determined in step 207 that a capacitive type touch input, i.e., a C touch input, is detected, the portable terminal proceeds to step 215 to determine a location at which the touch input of the user is made on the basis of a capacitance value.

After determining the touch input coordinate according to the user's touch input pattern as described above, proceeding to step 211, a touch point is determined, and then the procedure of FIG. 2 ends.

Figure 3:
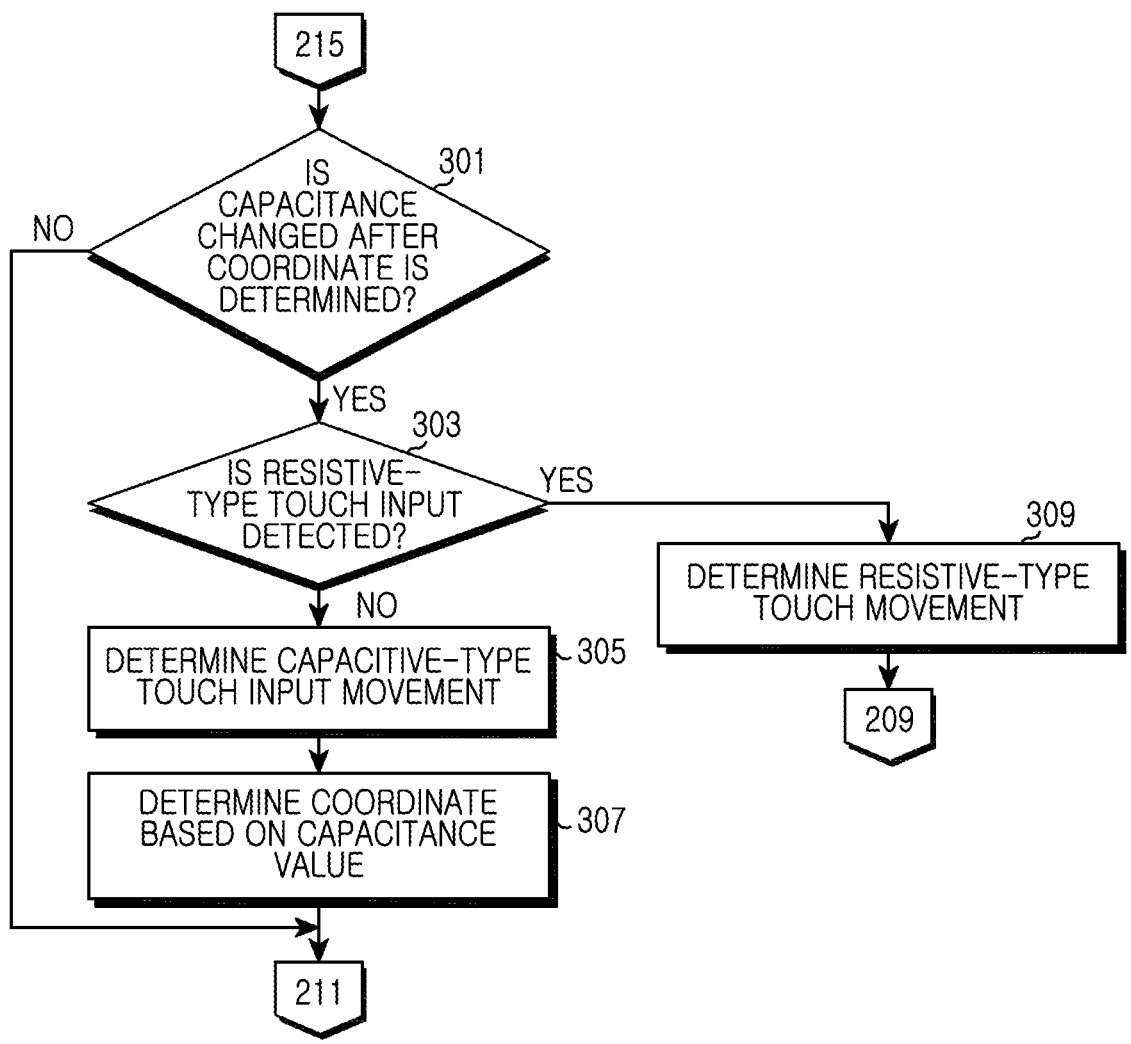
FIG. 3 is a flowchart illustrating a process of detecting a touch input movement after determining a coordinate depending on a touch input of a user in a portable terminal according to an exemplary embodiment of the present invention.

FIG. 3 is a flowchart illustrating a process of detecting a touch input movement after determining a coordinate depending on a touch input of a user in a portable terminal according to an exemplary embodiment of the present invention.

Referring to FIG. 3, in step 301, the portable terminal determines whether there is a change in a capacitance after determining a coordinate of a location at which the touch input of the user is detected on the basis of a capacitance value (step 215 of FIG. 2). Herein, the change in the capacitance implies that the capacitance changes when the user of the portable terminal performs a touch input and then performs a touch movement to a different point or when the user touches continuously the different point.

If it is determined in step 301 that there is no change in the capacitance after determining the coordinate, the portable terminal determines that another touch input of the user is not made, and then step 211 of FIG. 2 is performed.

Otherwise, if it is determined in step 301 that the capacitance changes after determining the coordinate, proceeding to step 303, the portable terminal determines whether a resistive type touch input is detected. That is, the portable terminal determines whether the capacitance changes as a result of the resistive type touch input of the user in step 303.

Since the portable terminal has a multi-touch panel capable of performing both the resistive type and the capacitive type of touch input detection, the capacitance may change when the capacitive type electrode films are brought in contact with each other.

If it is determined in step 303 that the resistive type touch input is detected, the portable terminal proceeds to step 309 to determine that the resistive type touch movement occurs, and then step 209 of FIG. 2 is performed.

Otherwise, if it is determined in step 303 that the capacitive type touch input is detected, the portable terminal proceeds to step 305 to determine that the touch input or touch movement made by the user is the capacitive type. In step 307, a coordinate at which the touch input occurs is determined based on the capacitance value.

Thereafter, step 211 of FIG. 2 is repeated.

Figure 4:
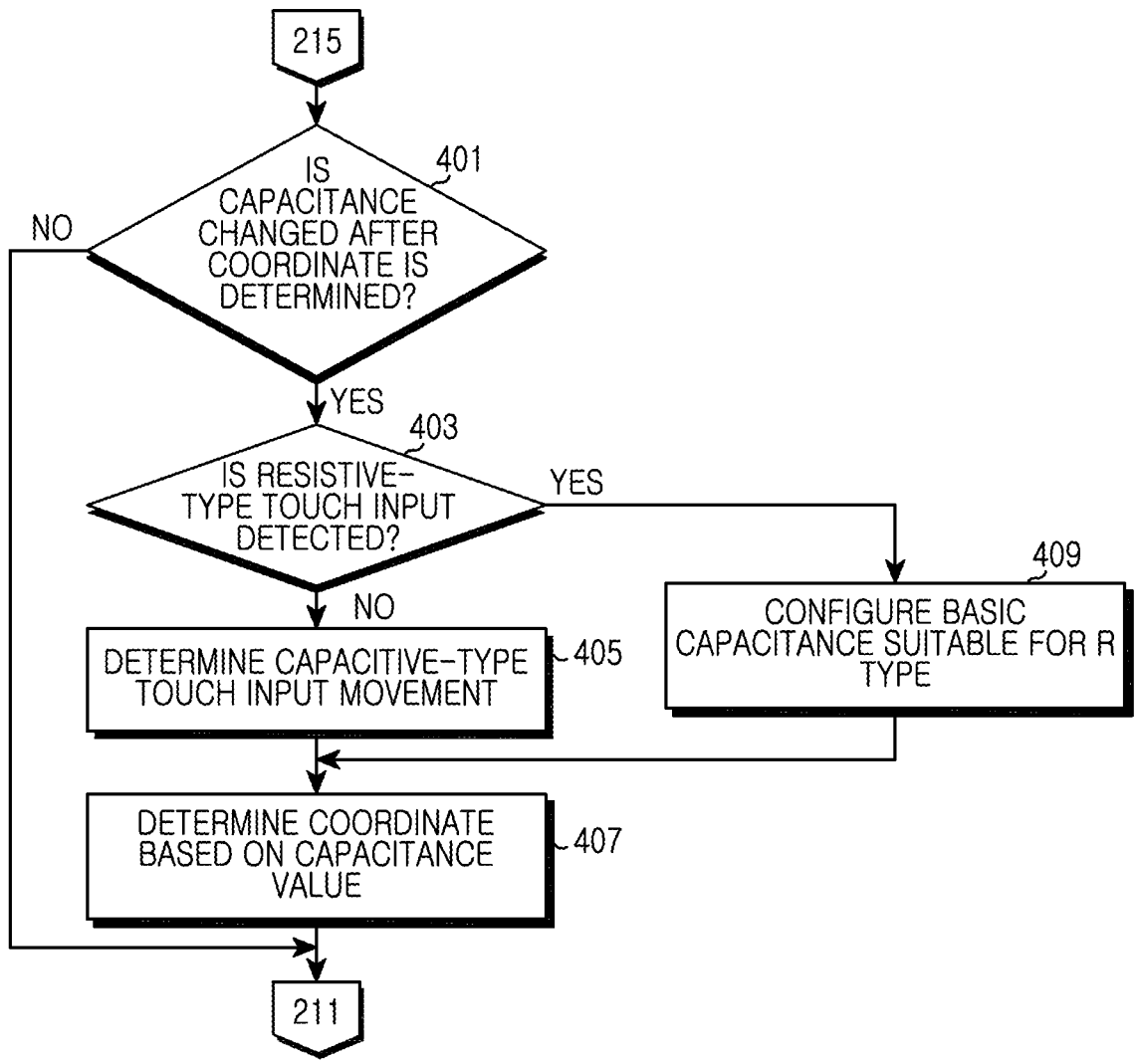
FIG. 4 is a flowchart illustrating a process of detecting a touch input movement before determining a coordinate depending on a touch input of a user in a portable terminal according to an exemplary embodiment of the present invention.

FIG. 4 is a flowchart illustrating a process of detecting a touch input movement before determining a coordinate depending on a touch input of a user in a portable terminal according to an exemplary embodiment of the present invention.

Referring to FIG. 4, in step 401, the portable terminal determines whether there is a change in a capacitance before determining a coordinate of a location at which a touch input of a user is made on the basis of a capacitance value (step 215 of FIG. 2). Herein, the change in the capacitance implies that the capacitance changes when the user of the portable terminal performs a touch input and then performs a touch movement to a different point or when the user touches continuously the different point.

If it is determined in step 401 that there is no change in the capacitance before determining the coordinate, the portable terminal determines that another touch input of the user is not made, and then step 211 of FIG. 2 is performed.

Otherwise, if it is determined in step 401 that the capacitance changes before determining the coordinate, proceeding to step 403, the portable terminal determines whether a resistive type touch input is detected. That is, the portable terminal determines whether the capacitance changes as a result of the resistive type touch input of the user in step 403.

Since the portable terminal has a multi-touch panel capable of performing both the resistive type and the capacitive type of touch input detection, the capacitance may change when the capacitive type electrode films are brought into contact with each other.

If it is determined in step 403 that the resistive type touch input is detected, the portable terminal proceeds to step 409 to configure a basic capacitance suitable for the resistive type touch input. In step 407, the portable terminal determines a touch input coordinate of the user on the basis of the reconfigured basic capacitance. In this case, the portable terminal determines the user's touch input coordinate by reconfiguring the basic capacitance which varies depending on a resistive type touch input since the user's touch input is detected before determining the coordinate on the basis of the capacitance value of step 215 of FIG. 2.

Otherwise, if it is determined in step 403 that the capacitive type touch input is detected, the portable terminal proceeds to step 405 to determine that the touch input or touch movement made by the user is the capacitive type. Then, in step 407, a coordinate at which the touch input occurs is determined based on the capacitance value.

Thereafter, step 211 of FIG. 2 is repeated.

Figure 5:
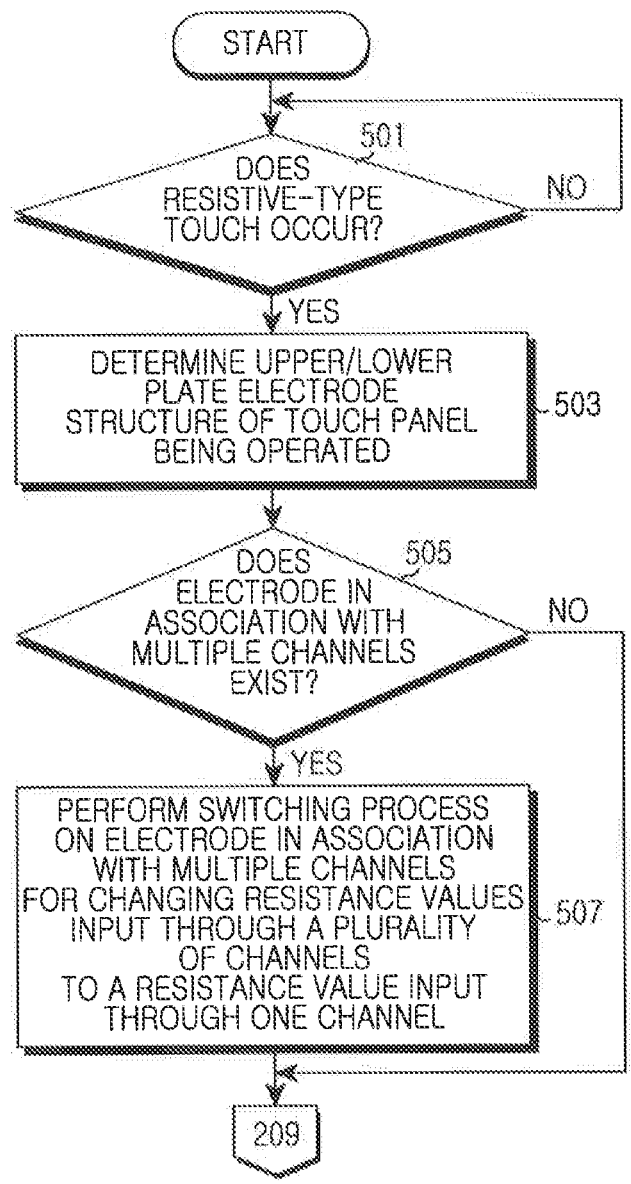
FIG. 5 is a flowchart illustrating an electrode switching process of a portable terminal according to an exemplary embodiment of the present invention.

FIG. 5 is a flowchart illustrating an electrode switching process of a portable terminal according to an exemplary embodiment of the present invention.

Referring to FIG. 5, the electrode switching is a process of changing resistance values input through a plurality of channels to a resistance value input through one channel when an upper or lower plate of a multi-touch panel operates in a multi-channel structure.

Before explaining the electrode switching process, referring to Table 1, the upper and lower plates of the portable terminal may operate as shown in Table 1 below according to an exemplary embodiment of the present invention.

TABLE 1

| R/C | layer | lower plate (electrode) | | | lower plate | | | upper plate | | | upper plate (electrode) | | | S/W |
|---|---|---|---|---|---|---|---|---|---|---|---|---|---|---|
| | | S | R | C | S | R | C | S | R | C | S | R | C | |
| R (4-wire type) | 1 layer | | | | R4 | X | — | R4 | Y | — | C1 | | M | — |
| | 1 layer + GND | | | | R4 | X | GND | C1 | Y | M | | | | UP |
| | 2 layer | | | | C2 | X | XM | C2 | Y | YM | | | | UP, LP |
| | 2 layer + GND | | | | R4 | X | GND | C2 | Y | YM | C2 | X M | | UP, LP |
| | 2 layer + GND | GND | | GND | C2 | X | XM | C2 | Y | YM | | | | UP, LP |
| | 4 wire + GND | | | | R4 | X | GND | R5 | Y | XY | | | | UP |
| R (5-wire type) | 1 layer | | | | GND | GND | — | R5 | XY | — | C1 | — | M | — |
| | 1 layer + GND | | | | GND | GND | GND | C1 | XY | M | | | | UP |
| | 2 layer (+GND) | | | | GND | GND | GND | C2 | XY | XM | C2 | — | Y M | UP |
| | 4 wire + GND | | | | GND | GND | GND | R5 | XY | XY | | | | — |

TABLE 1-continued

| R/C | layer | lower plate (electrode) | | | lower plate | | | upper plate | | | upper plate (electrode) | | | S/W |
|---|---|---|---|---|---|---|---|---|---|---|---|---|---|---|
| | | S | R | C | S | R | C | S | R | C | S | R | C | |
| R (multi type) | 4 wire | | | | C2 | XM | — | C2 | YM | XY | | | | UP |
| | 2 layer | | | | C2 | XM | XM | C2 | YM | YM | | | | — |
| | 3 layer (+GND) | GND | | GND | C2 | XM | XM | C2 | YM | YM | | | | — |
| C (4-wire type) | 1 layer | | | | | | | C2 | XY | M | | | | UP |
| | 1 layer + GND | | | | GND | GND | GND | C2 | XY | M | | | | UP |
| | 2 layer | | | | C2 | — | XM | C2 | XY | YM | | | | UP |
| | 2 layer + GND | GND | | GND | C2 | — | XM | C2 | XY | YM | | | | UP |

In Table 1, LP denotes Lower Plate, UP denotes Upper Plate, S denotes Structure, R denotes resistive type, and C denotes capacitive type. Referring to Table 1 above, when the multi-touch panel uses a 4-wire resistive type, the lower plate may be used in an R4 structure (4-wire resistive type) and a C2 structure (2-wire capacitive type), and the upper plate can be used in an R4 structure (4-wire resistive type), a C1 structure (1-layer multi-channel capacitive type), a C2 structure (2-layer multi-channel capacitive type), and an R5 structure (5-wire resistive type).

For one example, when the multi-touch panel operates with the lower plate that recognizes a value X by using the R4 structure and the upper plate that recognizes a value Y by using the R4 structure, the multi-touch panel can be implemented using the 4-wire resistive type.

For another example, when the multi-touch panel operates with the lower plate that recognizes the value X by using the C2 structure and the upper plate that recognizes the value Y by using the C2 structure, the multi-touch panel can be implemented using the 4-wire resistive type. However, the C2 structure may not be used in the 4-wire or 5-wire resistive type that uses one channel as an electrode consisting of a plurality of channels. Therefore, the portable terminal should perform a switching process for adding resistances input through the plurality of channels as if they are input through one channel.

The portable terminal for performing the electrode switching process determines whether a resistive type touch input occurs in step 501. Herein, the portable terminal determines whether the resistive type touch input occurs in order to perform the switching process for using an electrode consisting of a plurality of channels even in case of the 4-wire or 5-wire resistive type that uses one channel.

If it is determined in step 501 that the resistive type touch input does not occur, step 501 is repeated.

Otherwise, if it is determined in step 501 that the resistive type touch input occurs, proceeding to step 503, the portable terminal determines an electrode structure of upper and lower plates of the touch panel which is currently operating.

In step 505, the portable terminal determines whether there is an electrode in association with a plurality of channels. That is, the portable terminal determines whether one of the upper plate or the lower plate of the multi-touch panel that can operate as shown in Table 1 above operates as an electrode consisting of one channel and the other plate operates in an electrode structure consisting of a plurality of channels. In this case, the portable terminal determines whether the upper plate and the lower plate operate in different structures. If the upper plate and the lower plate operate in the same structure, the electrode switching process is not necessarily performed.

If it is determined in step 505 that there is no electrode in association with multiple channels, step 209 of FIG. 2 is repeated.

Otherwise, if it is determined in step 505 that the electrode in association with the multiple channels exists, proceeding to step 507, the portable terminal performs the electrode switching process on the electrode in association with the multiple channels.

Herein, the portable terminal performs the electrode switching when the upper plate and the lower plate operate in different structures and any one of electrodes operates in a multi-channel structure. As described above, if the upper plate and the lower plate operate in the same structure, the electrode switching process is not necessarily performed.

Figure 6A:
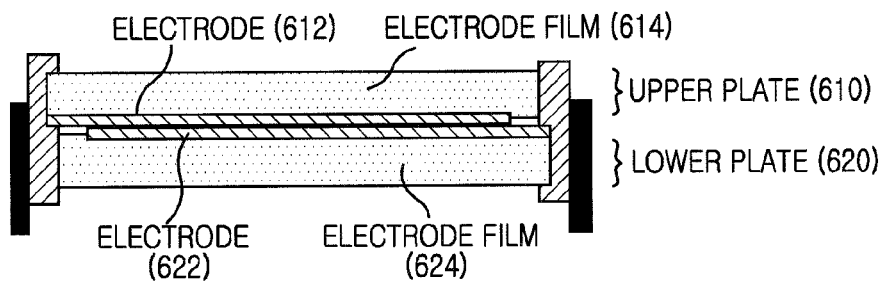
FIG. 6A to 6B illustrate upper and lower plate electrodes according to an embodiment of the present disclosure.
Figure 6B:
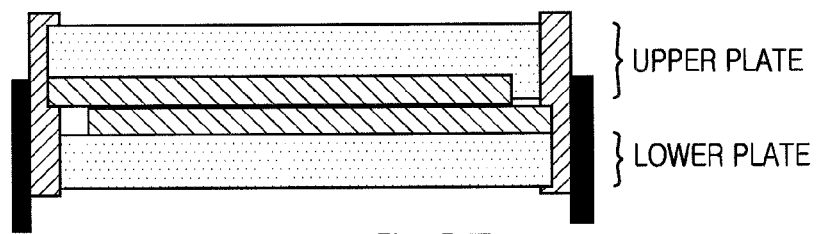

FIG. 6A to 6B illustrate upper and lower plate electrodes according to an embodiment of the present disclosure.

Referring to FIG. 6A, the figure illustrates an upper plate 610 and an electrode 612 comprising electrode film 614; and a lower plate 620 and an electrode 622 comprising electrode film 624.

Referring to FIG. 6B, the figure illustrates a structure similar to FIG. 6, wherein the electrodes 612 and 622 are shown as being larger than in FIG. 5.

Figure 6C:
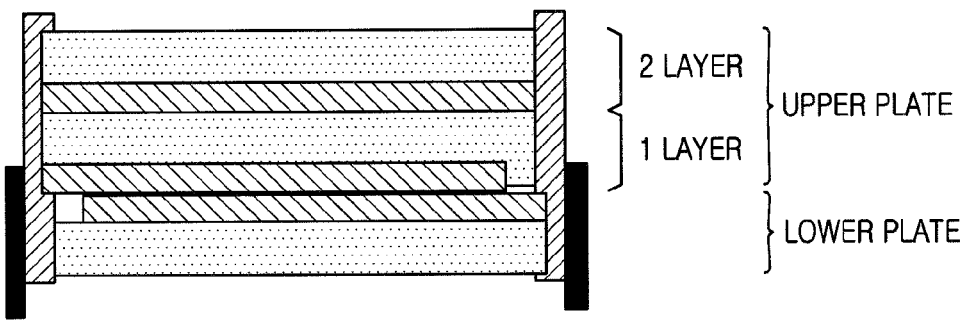
FIG. 6C to 6D illustrate upper and lower plate electrodes according to another embodiment of the present disclosure.
Figure 6D:
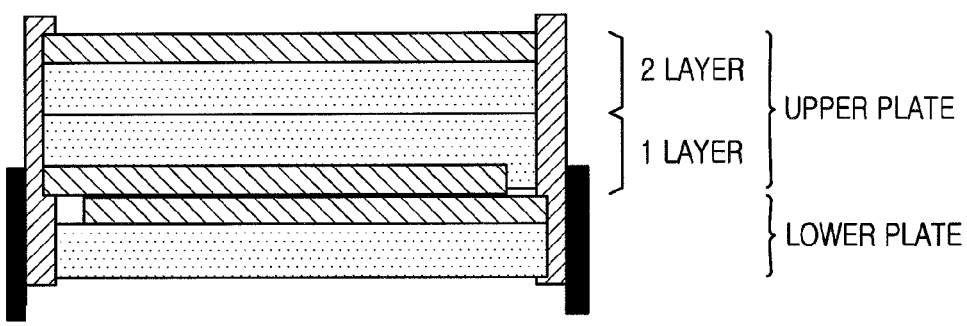

FIG. 6C to 6D illustrate upper and lower plate electrodes according to another embodiment of the present disclosure.

Referring to FIGS. 6C and 6D, the figures illustrates upper and lower plate electrodes that are of a different structure than one another. In FIGS. 6C and 6D, the upper plate electrode is a 2-layer electrode.

According to exemplary embodiments of the present invention, an apparatus and method for providing a touch panel capable of performing both a capacitive type and a resistive type of touch input detection in one touch panel in a portable terminal are provided. One touch panel can be used to detect the two types of touch inputs by using a multi-touch panel that uses capacitive type electrode films as resistive type upper and lower plate electrodes.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. An apparatus for a touch input of a portable terminal, the apparatus comprising:
   a multi-touch panel for performing both a capacitive type and a resistive type of touch input detection in one touch panel;

a pattern determining unit for analyzing a touch input pattern of a user by using the multi-touch panel; and a touch manager for determining a touch input coordinate corresponding to the touch input pattern of the user based on one of the capacitive type and the resistive type of touch input detection, wherein the multi-touch panel comprises upper and lower plate electrodes that are of a different structure from one another, and wherein the upper plate electrode is a 2-layer multi-channel capacitive type electrode film.

2. The apparatus of claim 1, wherein both of the upper and lower plate electrodes comprise capacitive type electrode films.

3. The apparatus of claim 1, wherein the pattern determining unit determines a touch input pattern in which only the upper plate is touched to an extent sufficient to perform a capacitance type of touch input detection as a capacitance type touch and a touch input pattern in which a touch is made to an extent to perform a resistive type of touch input detection when the upper and lower plates are brought into contact as a resistive type touch.

4. The apparatus of claim 3, wherein, if the resistive type touch is detected and then a change in capacitance is detected, the touch manager determines that the capacitance changes due to the resistive type touch and determines a touch movement coordinate based on the resistive type of touch input detection.

5. The apparatus of claim 3, wherein if the resistive type touch is detected, the touch manager determines an electrode structure of the multi-touch panel, and if it is determined that the electrode structure of the upper plate or the lower plate is a structure that uses a plurality of channels, the touch manager performs electrode switching on an electrode that uses the plurality of channels.

6. The apparatus of claim 5, wherein the electrode switching comprises a switching process for adding resistances input through the plurality of channels as if they are input through one channel.

7. The apparatus of claim 6, wherein the touch manager performs electrode switching in order to use an electrode consisting of a plurality of channels.

8. The apparatus of claim 7, wherein the resistive type of touch input detection comprises one of a 4-wire and a 5-wire resistive type of touch input detection that uses one channel.

9. A touch input method of a portable terminal, the method comprising:

analyzing a touch input pattern of a user by using a multi-touch panel for performing both a capacitive type and a resistive type of touch input detection in one touch panel; and determining a touch input coordinate corresponding to the touch input pattern of the user based on one of the capacitive type and the resistive type of touch input detection, wherein the multi-touch panel comprises upper and lower plate electrodes that are of a different structure from one another, and wherein the upper plate electrode is a 2-layer multi-channel capacitive type electrode film.

10. The method of claim 9, wherein both of the upper and lower plate electrodes comprise capacitive type electrode films.

11. The method of claim 9, wherein the touch input pattern of the user includes one of a touch input pattern corresponding to a capacitance type touch in which only the upper plate is touched to an extent sufficient to perform a capacitance type of touch input detection and a touch input pattern corresponding to a resistive type touch in which a touch is made to an extent to perform a resistive type coordinate when the upper and lower plates are brought into contact.

12. The method of claim 11, further comprising:
detecting the touch input pattern corresponding to the capacitance type touch;
determining whether the capacitance changes due to the resistive type touch input; and
upon detecting that the capacitance changes due to the resistive type touch, determining a touch movement coordinate based on the resistive type of touch input detection.

13. The method of claim 11, further comprising:
if the touch input pattern corresponding to the resistive type touch is detected, determining an electrode structure of the multi-touch panel; and
if it is determined that the electrode structure of the upper plate or the lower plate is a structure that uses a plurality of channels, performing electrode switching on an electrode that uses the plurality of channels.

14. The method of claim 13, wherein the electrode switching comprises a switching process for adding resistances input through the plurality of channels as if they are input through one channel in order to use an electrode consisting of a plurality of channels.

15. The method of claim 14, wherein the switching process comprises a process for using an electrode consisting of a plurality of channels.

16. The method of claim 15, wherein the resistive type of touch input detection comprises one of a 4-wire and a 5-wire resistive type of touch input detection that uses one channel.

17. A touch input apparatus of a portable terminal, the apparatus comprising:

a touch screen panel for performing a capacitive type of touch input detection and a resistive type of touch input detection by using capacitive type electrode films as resistive type upper and lower plate electrodes;

a pattern determining unit for determining a touch input pattern corresponding to a capacitive type touch when a touch is made to an extent sufficient to perform the capacitance type of touch input detection and for determining a touch input pattern of a resistive type touch when a touch is made to an extent to perform the resistive type of touch input detection when the upper and lower plates are brought into contact; and a touch manager for determining a touch input coordinate corresponding to a touch input pattern of the user, wherein the touch manager performs an electrode switching process for changing resistance values input through a plurality of channels to a resistance value input through one channel when the upper and lower plate electrodes are of a different structure from one another and the upper plate electrode is a 2-layer multi-channel capacitive type electrode film.

18. The apparatus of claim 17, wherein the touch manager adds resistances input through the plurality of channels in order to use an electrode consisting of a plurality of channels.

19. The apparatus of claim 18, wherein the resistive type of touch input detection comprises one of a 4-wire and a 5-wire resistive type that uses one channel.

* * * * *